April 7, 1970  R. L. BROWN  3,504,424
METHOD FOR FASTENING TRIM
Filed June 16, 1967  2 Sheets-Sheet 1

INVENTOR.
ROBERT L. BROWN.
BY
WILSON, SETTLE, BATCHELDER
& CRAIG.
ATT'YS.

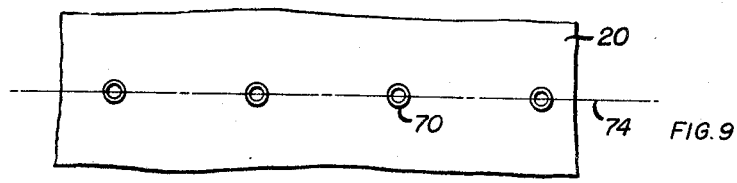
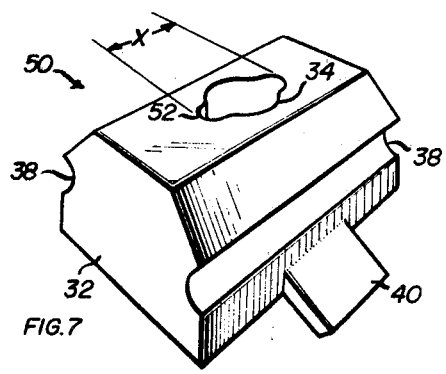
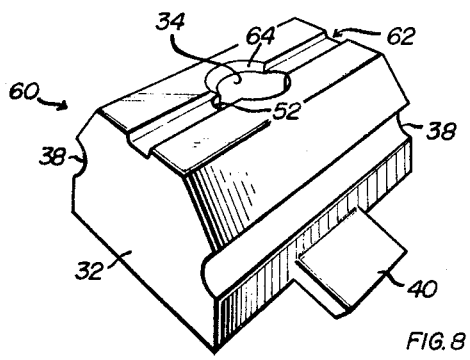
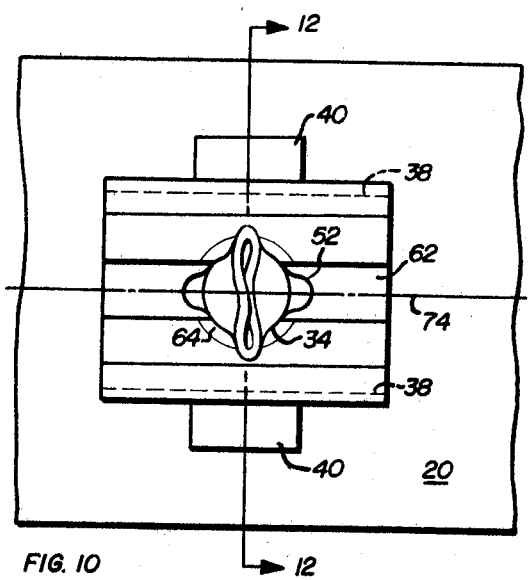
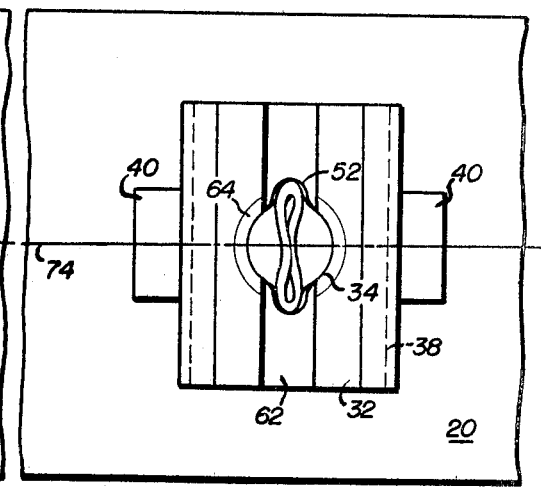
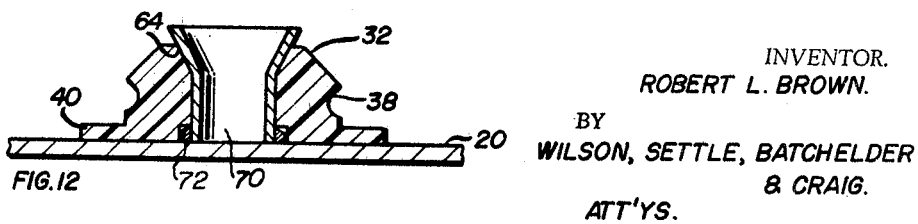

United States Patent Office 3,504,424
Patented Apr. 7, 1970

3,504,424
METHOD FOR FASTENING TRIM
Robert L. Brown, Bloomfield Hills, Mich., assignor to Robin Products Company, Warren, Mich., a corporation of Michigan
Filed June 16, 1967, Ser. No. 646,600
Int. Cl. B23p 11/00, 11/02; B21d 39/00
U.S. Cl. 29—430                                  6 Claims

ABSTRACT OF THE DISCLOSURE

A method for securing trim strips to a structural support. The method includes the steps of moving the structural support through successive finishing stations, and at one station welding a plurality of non-corrosive deformable metal members at pre-determined locations on the support. The locations are coordinated with the pre-determined desired position of the trim. The welding is done at the surface of the structural support and throughout the entire extent of contact of the deformable metal members and the surface of the structural support to produce a completely exposed peripheral joint. At a subsequent finishing station the structural support is painted. The painting includes the application to the structural support and to the deformable metal members of at least one paint coat providing a continuous paint film which seals the continuous peripheral joints between each of the metal members and the structural support against corrosion. After drying the paint and at a further subsequent finishing station a clip having an aperture therein is located on each of the metal members by moving the clip axially on the metal member. The metal member is of such a length that a portion of it projects beyond the aperture of the clip. The exposed portion of the metal member is distorted to trap the clip between the distorted portion of the metal member and the structural support surface.

BACKGROUND OF THE INVENTION

The present invention relates generally to the finishing of the exterior surface of an automobile body and more particularly to method of and apparatus for securing decorative trim strips or pieces to the exterior surface of an automabile body.

Heretofore, it has been common practice to connect trim strips to the exterior surface of an automobile body by screws, bolts or other equivalent devices which extend through openings formed in the body. In this type of connection, it was common to provide some type of sealer to prevent leakage between the aperture and the securing means associated with the trim strip connectors. However, the holes or apertures through which the fasteners extended could not properly be sealed and thus would serve as the first point at which rusting would occur.

Recently it has been proposed to eliminate the use of an aperture through the body of the automobile by welding or otherwise securing some type of button to the body to define a male fastener. The male fastener is contoured to receive female adapter means which are capable of resiliently maintaining a trim strip on the autobile body. Such a method and apparatus are generally disclosed in Sweeney No. 3,153,468.

Another apparatus for securing a trim strip to an impervious section of an automobile body is disclosed in Meyer No. 3,188,730 in which a very complex adapter is received by the button secured to the automobile body with the adapter locked to the button by sliding the adapter along the surface of the body and a trim strip is received by the adapter.

SUMMARY OF THE INVENTION

Generally speaking, a deformable member, such as a hollow rivet, is secured to an impervious unfinished surface of an automobile body. Thereafter, all of the steps required to provide a final finish on the exterior surface of the body are performed. After the body has been finished, clips are located on each of the deformable members and are locked thereto by deforming an exposed portion of the member extending beyond the distal surface of the clip to thereby lock the clip to the finished body. The clip has retaining means thereon for removably locking the trim strip or molding device on the automobile body. According to another aspect of the invention, the clips may be configured so as to be readily removable from the deformed member.

Thus, the primary object of the present invention is to provide an improved method for removably securing a trim piece to a structural support, such as an automobile body.

Another object is the provision of a method for removably securing a trim piece to an automobile body panel utilizing a deformable member welded to the panel body and a clip having an aperture therein which is axially mounted on the member, being locked thereon and thus to the panel by deforming an exposed portion of the member extending beyond the aperture of the clip.

BRIEF DESCRIPTION OF THE DRAWINGS

FIGURE 7 is a perspective view of a slightly modified form of a fastener clip;

FIGURE 8 is a perspective view of futher modification of the fastener clip shown in FIGURE 7;

FIGURE 9 is a fragmentary plan view of the exterior surface of an automobile body having a slightly modified first part of the fastener assembly secured thereto;

FIGURE 10 is a plan view of the body exterior surface showing the clip of the fastener assembly in a lock position on the automobile body;

FIGURE 11 is similar to FIGURE 10 but showing the clip of the fastener assembly in a removable position on the automobile body; and FIGURE 12 is a sectional view taken generally along lines 12—12 of FIGURE 10.

FIGURE 1 of the drawings shows a conventional automobile body generally indicated at 20 supported on a conventional conveyor mechanism 21 to be moved along an assembly line for performing a number of different steps of finishing the automobile body and attaching the trim strip thereto. The automobile body has a plurality of tubular members 22 secured thereto which form the first part of the fastener assembly of the present invention.

As shown in FIGURE 2, the first part of the fastener assembly is in the form of a non-corrosive, deformable metallic member, such as a rivet, which is welded or otherwise secured to an impervious section of the automobile body 20. Thus, in the embodiment shown in FIGURES 1 through 6, the rivet includes a circular base portion 24 and a cylindrical hollow, deformable portion 26 extending outwardly therefrom and having a distal end 28 spaced from the automobile body surface. The first part 22 is secured to the body or panel 20 by a weld 25 which connects the entire periphery of the base 24 to the panel. The welding is preferably performed throughout the extent of contact of the rivet head with the body panel to produce a completely exposed continuous peripheral joint between each rivet and the body panel.

Figure 3:
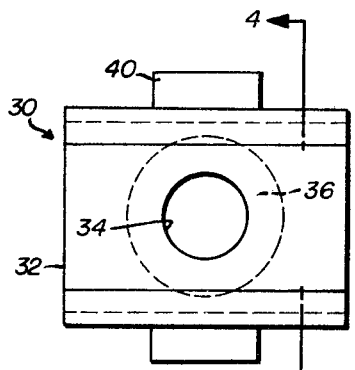
FIGURE 3 is an enlarged plan view of the clip forming the second part of the inventive fastener assembly.
Figure 4:
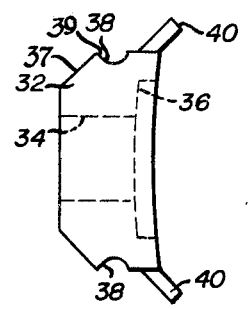
FIGURE 4 is a sectional view taken along lines 4—4 of FIGURE 3.

The second part of the fastener assembly is shown in FIGURES 3 and 4 as a plastic clip 30 which includes a body portion 32 having an opening 34 extending therethrough with the opening having a configuration corresponding to the cross-sectional configuration of the rivet 22 secured to the automobile body. Thus, in the illustrated embodiment, the first part 22 or the body portion 26 of the rivet is circular in cross-section and has an outer diameter substantially equal to the diameter of the opening 34.

The lower end of the opening 34 preferably has an enlarged recess 36 of a diameter equal to the diameter of the base 24, as well as the weld or securing means 25, and the lower surface of the clip is contoured, as shown in FIGURE 4, for a purpose to be described hereinafter. The two spaced vertically disposed surfaces of the body 32 respectively have first and second angularly related surfaces 37 and 39, the latter of which defines a part of a groove 38 which defines retaining means for the trim strip 42 in the final assembly of the entire device. Also, the body is provided with angularly disposed tabs 40 formed integral therewith to prevent any direct contact of the trim strip with the automobile body.

In finishing the automobile body and securing the trim strip therethrough, the body is moved along the conveyor 21 to a plurality of stations at which the several steps to be described are performed. Thus, at a first station the rivets 22 of the fastener assembly are secured, as by welding 25, to the unfinished surface of the body 20 along a predetermined line which defines the final position of the trim strip on the automobile. This line may be impressed on the body surface.

After the rivets 22 are secured to the body 20, the body may be moved along successive stations to provide the final finishing such as buffing, sanding and painting. Since the first part of the fastener assembly is very small, on the order of a diameter of 0.180 inch and a height or length of 0.200 inch, the subsequent finishing steps or operations may readily be formed without any undue interference of the first part already secured to the body surface. The various finishing steps or operations will result in a continuous film of paint or the like which seals the continuous peripheral joint between the automobile body surface and the rivet assembly as well as the rivet itself. Thus, the entire outer or exposed surface of the automobile body having the rivet secured thereto is provided with a continuous seal which will prevent any corrosion or rust.

After the finishing steps have been performed, the finished body may be moved to a subsequent station where the clips are secured to the automobile body. In locating and securing the clips 30 to the body 20, the longitudinally disposed grooves 38 are located on opposite sides of the center line defined by the plurality of first parts 22. After the clips 30 have been located on the first part 22 of the fastener assembly, the distal end of each rivet 22 is deformed to thereby lock the clip to the automobile body surface. Preferably, the location of the clip and deformation of the rivet are simultaneously performed. Thus, by way of example and not of limitation, the clip may be carried on an end of a crimping or deforming gun and may be located thereon in proper position with the distal end of the deformable member subsequently crimped or otherwise deformed by the gun to lock the clip 30 to the automobile body 20.

Figure 5:
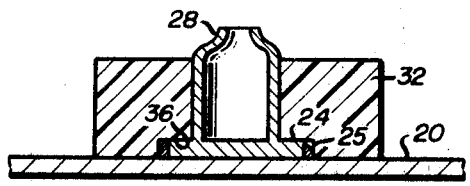
FIGURE 5 is a sectional view of the fastener assembly in its finished condition on the automobile.
Figure 6:
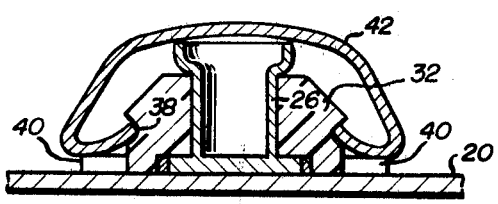
FIGURE 6 is a view similar to FIGURE 5 but taken in a plane perpendicular to the plane of the view shown in FIGURE 5.

As clearly shown in FIGURES 5 and 6, the length of the rivet 22 is slightly greater than the thickness of the body 32 forming part of the clip 30. Thus, the rivet 22 can readily be crimped to provide a deformed portion at the distal end 28 which is slightly greater than any cross-sectional dimension of the member in its original condition. This will securely lock the clip to the automobile body 20 and, by properly aligning the grooves 38, the several spaced clips will define a substantially continuous groove on opposite sides of the center line of the final position of the trim strip. During the deformation the lower contoured surface of the clip will be flattened to thereby place the clip in tension in its final assembled position.

The final step is to secure the trim strip or molding 42 to the plurality of clips. During the placement of the trim strips, the angular surfaces 37 define camming surfaces for the lower portion of the strip and in the assembled position the surfaces 39 define locking faces for the free ends of the strip, as clearly shown in FIGURE 6.

A slightly modified form of clip 50 is shown in FIGURE 7, and since the various parts of the clip 50 are identical to the parts shown in FIGURES 3 and 4, like reference numerals have been used to indicate the identical parts of the two clips. In the modified clip shown in FIGURE 7, the opening 34 also includes a pair of spaced diametrically opposed recesses 52 defining an elongated opening or slot having a length ($x$) at least equal to and preferably slightly greater than the length of the deformed portion of the first part 22 of the fastener assembly, for a purpose to be described later.

A further modified clip 60 is shown in FIGURE 8 and is in most respects identical to the clip 50 shown in FIGURE 7. However, the modified clip shown in FIGURE 8 further includes an elongated groove 62 extending the length of the clip with the groove extending across the upper end of the recesses 52 and the center of the opening 34. The opening 34 is also chamfered or beveled at 64. This groove 62 defines a recess for receiving a deforming tool while the beveled surface 64 cooperates with a portion of the deformed rivet, in a manner to be described later.

A slightly modified form of rivet assembly is shown in FIGURES 9 through 12. Thus, the rivet 70 is a sleeve type fixedly secured to the automobile body surface, as by welding 72, to define a deformable or first part of the fastener assembly. The plurality of fasteners 70 are secured to the body along a predetermined axis or line 74 which defines the final position of the trim strip received thereon. The axis is defined by establishing a line on the surface of the automobile body or support 20.

As shown in FIGURE 10, in assembling the modified clip shown in FIGURE 8, as well as the clip shown in FIGURE 7, the clips are located on the rivets so that the elongated slots defined by the recesses 52 are aligned with the predetermined line 74. Of course this will place the grooves 38 in alignment on opposite sides of the center line 74 defined by the rivets 70. After the clips have been properly located on the rivets by displacing the clips axially on the rivets, exposed portions of the rivets are contacted and distorted or flattened so that the longitudinal axis of the deformed elongated portion extends perpendicular to the line 74 defining the final position of the trim strip. Of course, this operation is performed substantially simultaneous to the location of the clip on the first part of the fastener assembly.

As can readily be seen from an examination of FIGURE 10, by crimping the first part 70 of the fastener assembly along an axis perpendicular to the axis of the elongated opening or slot 54, the clip will be trapped below the distorted position of the rivet to lock the clip automobile body panel. As shown in FIGURE 12 the effective locking thickness of the clip will be defined by the base of the groove and the lower surface of the clip. However, if it is desired to remove the clip from the automobile body surface at some further time, it is only necessary to rotate the clip to a second unlocking position approximately 90° from the first position shown in FIGURE 10 to a position shown in FIGURE 11 to thereby align the elongated deformed portion of the rivet with the elongated slot or opening defined by the recesses 52.

Also, by providing the recess or groove 62 on the upper surface of the clips 60, the crimping device can be received in this groove and most or all of the distorted rivets will be disposed below the upper surface of the body 32 of the clip 60. By utilizing the groove in the upper surface and the beveled surface 64 at the upper end of the opening 34, the length of the rivet can be decreased a considerable amount to further reduce any possibility of the rivet obstructing the final finishing steps of the automobile body surface after the rivet has been secured thereto.

Figure 1:
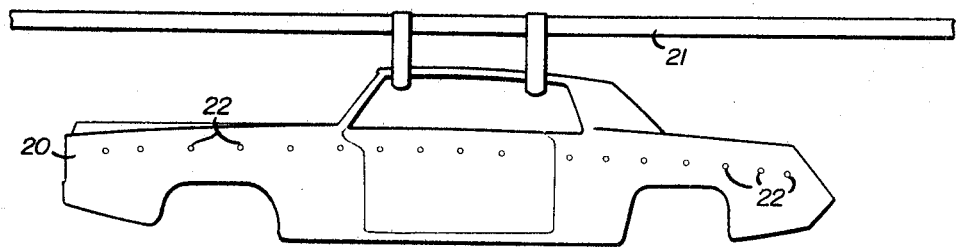
FIGURE 1 is a side elevation of a conventional automobile body having part of the fastener assembly of the invention shown on an enlarged scale for clarity.
Figure 2:
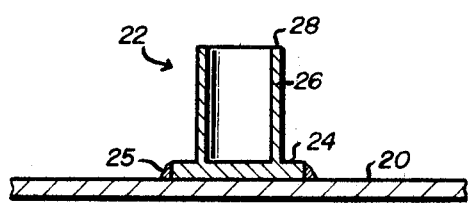
FIGURE 2 is an enlarged sectional view of the part of the fastener assembly shown in FIGURE 1.

Of course, it is readily apparent that the hollow tubular member 70 shown in FIGURES 9 through 12 could readily be substituted for the headed tubular member 22 in the embodiment shown in FIGURES 1 through 6. Likewise any of the clips shown in FIGURES 3, 7 and 8, respectively, can be utilized with the tubular deformable member having the base portion 24 as shown in FIGURE 2. Furthermore, in using the clips shown in FIGURES 7 and 8, the rivets could readily be attached to the surface 20 in the deformed condition and the clips applied by location on the rivets in the position shown in FIGURE 10 and rotation to the position shown in FIGURE 11.

Although the present invention has been described in conjunction with several preferred embodiments, it is to be understood that modifications and variations may be restored to without departing from the spirit of the invention as defined by the following claims.

I claim:

1. In a method of finishing an automobile body panel including the painting thereof and attachment thereto of a fastener for trim wherein the body panel is moved through successive finishing stations and at one station a rivet is secured to the body panel by welding at the surface of the body panel and throughout the entire extent of contact of the rivet with the body panel producing a completely exposed continuous peripheral joint, at a subsequent station the body panel is painted to provide a continuous paint film which seals the continuous peripheral joint between the rivet and the body panel and at a further subsequent station an aperatured clip is located and secured to the rivet, the improvement of telescoping the clip over the rivet by moving said clip axially on said rivet, the rivet projecting through the aperature in said clip and therebeyond, contacting that exposed portion of the rivet projecting beyond the aperature, and distorting the projecting portion of the rivet to splay outwardly the projecting rivet, thereby trapping the clip between the distorted rivet portion and the body panel surface.

2. The method as defined in claim 1 and wherein a plurality of rivets are welded to the body panel surface at spaced points along a line defining the final position of the trim on the body panel and a clip is mounted on each rivet through a slot in each clip, the further improvement of aligning each slot with the line defined by the rivets and in which the distorting of the rivets enlarges a portion thereof along a plane perpendicular to the line defined by the rivets.

3. The method as defined in claim 2, in which the clips are removable from the rivets by rotating the clips to align each slot with the respective enlarged portions of each rivet and moving the clips along the axis of the respective rivets.

4. The method as defined in claim 2, wherein each clip has an elongated groove in the surface spaced from the body panel aligned with the elongated portion of the slot and in which the major portion of the distortion of the rivet is accomplished within the groove.

5. The method as defined in claim 1, and in which a plurality of spaced rivets are secured along a line defining the final position of the trim with a clip secured to each rivet, each clip having a groove in the surface spaced from the panel body and an elongated slot extends through the clip which terminates in the groove, characterized in that the slot and groove are aligned with the line defined by the rivets when the clips are located on the rivets and the distortion is accomplished in the groove by flattening the rivets to provide a flattened portion greater than the diameter of the rivet and intersecting the line defined by the rivets.

6. The method as defined in claim 5, wherein the clips are removable by rotating each clip to align the slot with the flattened portion and displacing the clips axially of the rivets.

References Cited

UNITED STATES PATENTS

| 2,357,748 | 9/1944 | Lyon | 29—512 |
| 2,613,958 | 10/1952 | Richardson | 29—512 X |
| 3,153,468 | 10/1964 | Sweeney | 52—718 |
| 3,188,730 | 6/1965 | Meyer | 29—430 |
| 3,188,731 | 6/1965 | Sweeney | 29—430 |

THOMAS H. EAGER, Primary Examiner

U.S. Cl. X.R.

29—453, 512